(12) United States Patent
Tsukada et al.

(10) Patent No.: US 8,370,682 B2
(45) Date of Patent: Feb. 5, 2013

(54) VIRTUAL TAPE SYSTEM TAKE-OVER-CONTROLLED BY STANDBY SERVER COMPUTER

(75) Inventors: Shigeru Tsukada, Kawasaki (JP); Nobuyuki Hirashima, Kawasaki (JP); Takaaki Yamato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 468 days.

(21) Appl. No.: 12/341,569

(22) Filed: Dec. 22, 2008

(65) Prior Publication Data
US 2009/0249114 A1 Oct. 1, 2009

(30) Foreign Application Priority Data
Mar. 31, 2008 (JP) .................... 2008-089622

(51) Int. Cl.
*G06F 11/00* (2006.01)
(52) U.S. Cl. ........................... 714/13; 714/6.3
(58) Field of Classification Search ............... 714/13
See application file for complete search history.

(56) References Cited

U.S. PATENT DOCUMENTS

| | | | |
|---|---|---|---|
| 6,026,425 A * | 2/2000 | Suguri et al. ............ | 718/105 |
| 6,101,508 A * | 8/2000 | Wolff ..................... | 709/223 |
| 6,175,869 B1 * | 1/2001 | Ahuja et al. ............ | 709/226 |
| 6,601,084 B1 * | 7/2003 | Bhaskaran et al. ...... | 718/105 |
| 6,687,731 B1 * | 2/2004 | Kavak ..................... | 718/105 |
| 7,003,687 B2 * | 2/2006 | Matsunami et al. ...... | 714/4 |
| 7,236,987 B1 * | 6/2007 | Faulkner et al. ......... | 1/1 |
| 7,383,381 B1 * | 6/2008 | Faulkner et al. ......... | 711/114 |
| 7,460,470 B2 * | 12/2008 | McGee et al. ........... | 370/218 |
| 7,475,277 B1 * | 1/2009 | Holdman et al. ........ | 714/5 |
| 7,480,814 B2 * | 1/2009 | Shinohara et al. ....... | 714/4 |
| 7,487,390 B2 * | 2/2009 | Saika ..................... | 714/13 |
| 7,539,754 B2 * | 5/2009 | Chambliss et al. ...... | 709/224 |
| 7,694,166 B1 * | 4/2010 | Suggs et al. ............ | 714/4 |
| 7,797,572 B2 * | 9/2010 | Kawashima et al. .... | 714/7 |
| 2004/0233910 A1 * | 11/2004 | Chen et al. ............. | 370/395.5 |
| 2005/0015657 A1 * | 1/2005 | Sugiura et al. ......... | 714/6 |
| 2006/0190760 A1 * | 8/2006 | Saika ..................... | 714/4 |
| 2006/0209677 A1 * | 9/2006 | McGee et al. .......... | 370/216 |

(Continued)

FOREIGN PATENT DOCUMENTS

| | | |
|---|---|---|
| JP | 5-14450 | 1/1993 |
| JP | 11-203258 | 7/1999 |

(Continued)

OTHER PUBLICATIONS

Japanese Office Action issued Mar. 16, 2010 in corresponding Japanese Patent Application 2008-089622.

*Primary Examiner* — Kamini Patel
(74) *Attorney, Agent, or Firm* — Staas & Halsey LLP

(57) ABSTRACT

The computer system is capable of improving performance, reliability and redundancy. The computer system comprises: a plurality of server computers having different functions, the server computers being mutually connected by communication lines; a standby server computer being connected to each of the server computers by the communication lines, the standby server computer being capable of performing the function of each of the server computers; a detection unit for detecting an abnormal state of each of the server computers; and a take-over unit for controlling the standby server computer to take over the action of the abnormal server computer when the abnormal state of the abnormal server computer is detected by the detection unit.

12 Claims, 10 Drawing Sheets

U.S. PATENT DOCUMENTS

| | | | |
|---|---|---|---|
| 2006/0224764 A1* | 10/2006 | Shinohara et al. | 709/232 |
| 2007/0180314 A1* | 8/2007 | Kawashima et al. | 714/15 |
| 2007/0234115 A1* | 10/2007 | Saika | 714/13 |
| 2009/0217099 A1* | 8/2009 | Kato | 714/37 |
| 2009/0228676 A1* | 9/2009 | Naganuma et al. | 711/173 |
| 2010/0146327 A1* | 6/2010 | Takubo | 714/4 |

FOREIGN PATENT DOCUMENTS

| | | |
|---|---|---|
| JP | 00/43882 | 7/2000 |
| JP | 2003-208362 | 7/2003 |
| JP | 2007-133542 | 5/2007 |
| JP | 2007/094041 A1 | 8/2007 |

* cited by examiner

VIRTUAL TAPE SYSTEM TAKE-OVER-CONTROLLED BY STANDBY SERVER COMPUTER

BACKGROUND OF THE INVENTION

The present invention relates to a computer system, in which a plurality of server computers are mutually connected by communication lines.

In some computer systems, in each of which a plurality of computers are mutually connected by communication lines, a standby server computer is provided for recovering any one of the server computers broken down (see Japanese Laid-open Patent Publication No. 2007-133542).

In the normal state, the standby server computer monitors actions of the server computers. When an abnormal state of any one of the server computers is detected, the standby server computer takes over the action of the server computer in the abnormal state.

A virtual tape system, which is capable of controlling virtual tape unit at high speed by an interface for controlling magnetic tapes, now exists as an example of said computer system. The conventional virtual tape system will be explained.

A schematic view of a structure of the conventional virtual tape system is shown in FIG. 14.

The virtual tape system 10 comprises: a upper-level switch 11 capable of being connected to a main frame; a virtual tape unit 12; integrated channel processors (ICPs) 13 provided between the virtual tape unit 12 and the upper-level switch 11; and physical tape units 14. Integrated device processors (IDPs) 15 and virtual library processers (VLPs) 16 for managing the entire system are provided between the physical tape units 14 and the ICPs 13.

The ICPs 13 are connected to the IDPs 15 by an intermediate-level switch 17. The IDPs 15 are connected to the physical tape units 14 by a lower-level switch 18.

The ICPs 13 are server computes for reading data from and writing data in the virtual tape unit 12 and connected to terminal equipments of the main frame by the upper-level switch 11.

The VLPs 16 are server computers for controlling the entire system 10 and manages volumes of the virtual tape unit 12 and the physical tape units 14.

The IDPs 15 are server computers for backing up or restoring a logical volume of the virtual tape unit 12 in the physical tape units 14.

In the virtual tape system 10, a plurality of the server computers having the same functions are provided so as to form a redundant system.

Therefore, in the conventional virtual tape system 10, the ICPs 13, the VLPs 16 and the IDPs 15 are respectively connected in parallel, and the server computers having the same function monitor each other. In case that any one of the server computers having the same function comes into an abnormal state, the rest of the server computers supplement the action of the abnormal server computer.

In the above described conventional computer system, a plurality of the server computers having the same function are connected in parallel to form the redundant system, but the action of the abnormal server computer can be taken over by only the server computer having the function which is the same as that of the abnormal server computer. Therefore, in case that the abnormal state occurs, the system performs degenerate actions or essential actions only, so performance, reliability and redundancy of the system will be lowered.

Note that, in some conventional virtual tape systems, the server computers are accommodated in one housing. In this case, it is difficult to secure a space for installing a backup system for each of the server computers in the housing.

SUMMARY OF THE INVENTION

The present invention was conceived to solve the above described problems.

An object of the present invention is to provide a computer system, which includes a plurality of server computers having different functions and which is capable of preventing degenerate actions even if any one of the server computers comes into an abnormal state and capable of improving performance, reliability and redundancy.

To achieve the object, the present invention has following constitutions.

Namely, the computer system of the present invention comprises: a plurality of server computers having different functions, the server computers being mutually connected by communication lines; a standby server computer being connected to each of the server computers by the communication lines, the standby server computer being capable of performing the function of each of the server computers; detection means for detecting an abnormal state of each of the server computers; and take-over means for controlling the standby server computer to take over the action of the abnormal server computer when the abnormal state of the abnormal server computer is detected by the detection means.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

As described above, the conventional virtual tape system is an example of the computer system. Thus, a virtual tape system will be explained as a computer system of the present embodiment.

Figure 1:
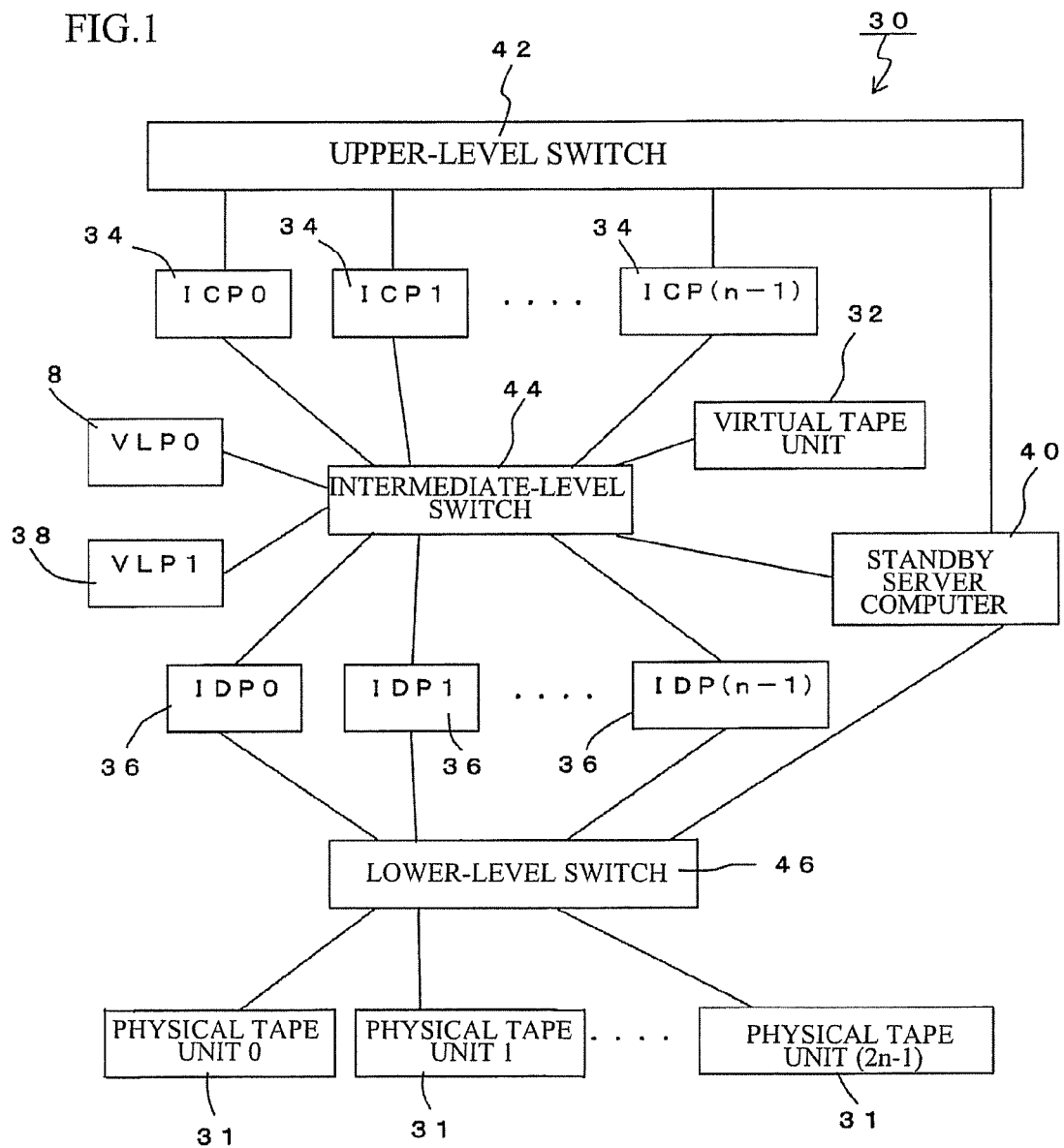
FIG. 1 is an explanation view of the computer system relating to the present invention.

The virtual tape system of the present embodiment is shown in FIG. 1.

The virtual tape system 30 is a system for storing various types of data in magnetic tapes, and the magnetic tapes are virtually formed. In the system, a user can use the virtual tapes without changing an interface for using the magnetic tapes. Therefore, by using the virtual tapes, inputting and outputting operations can be performed at high speed and required time for inputting and outputting operations can be shortened.

The virtual tape system 30 comprises: a plurality of physical tape units 31; a virtual tape unit 32; a plurality of ICPs 34; a plurality of IDPs 36; two VLPs 38; and a standby server computer 40. The ICPs 34, the IDPs 36 and the VLPs 38 are server computers, and the groups of the server computers have different functions.

The ICPs 34 are connected to an upper-level switch 42 in parallel by communication lines, e.g., optical fibers, under high speed digital communication standard SONET/SDH.

The upper-level switch 42 is connected to terminal equipments (not shown) of a main frame, which can be operated by the user. Note that, the communication standard is not limited to the SONET/SDH. Therefore, the ICPs 34 may be connected to the upper-level switch 42 by, for example, fiber channel (FC) lines. The FC lines are, for example, optical fibers or coaxial cables.

The ICPs 34, the virtual tape unit 32 and the IDPs 36 are respectively connected to an intermediate-level switch 44 by FC lines. The ICPs 34 and the IDPs 36 are connected to the intermediate-level switch 44 in parallel.

Two VLPs 38 are connected to the intermediate-level switch 44 by a local area network (LAN), etc. A communication standard of the LAN is, for example, Ethernet (R).

The IDPs 36 are connected to a lower-level switch 46 in parallel by FC lines.

The physical tape units 31 are connected to the lower-level switch 46 by LAN or FC lines under communication standards of peripheral equipments. In the present embodiment, the communication standards of the peripheral equipments are SCSI (Small Computer System Interface), etc.

Next, the units constituting the virtual tape system 30 will be explained.

(Physical Tape Unit)

Figure 2:
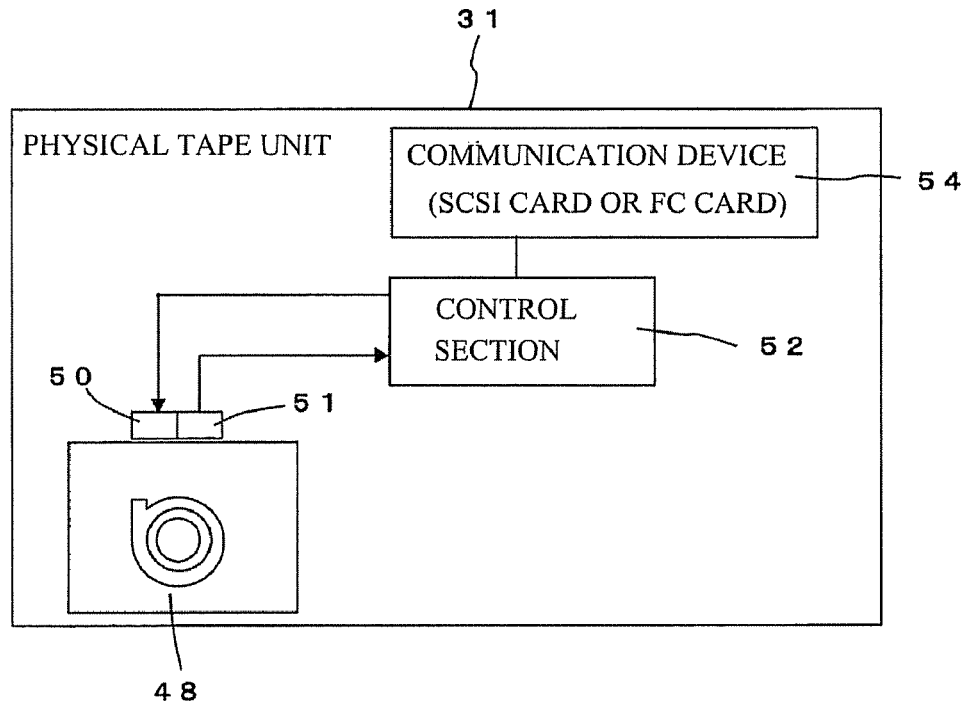
FIG. 2 is a block diagram of a physical tape unit constituting the computer system.

As shown in FIG. 2, the physical tape unit 31 comprises: a cartridge type magnetic tape 48; a write-head 50 for writing data in the magnetic tape 48; and a read-head 51 for reading data from the magnetic tape 48. The physical tape unit 31 further comprises a control section 51, which is constituted by a CPU and memories and which controls the physical tape unit 31. A communication device 54, e.g., SCSI card, FC card, is connected to the control section 52 so as to communicate with the lower-level switch 46.

(IDP)

Figure 3:
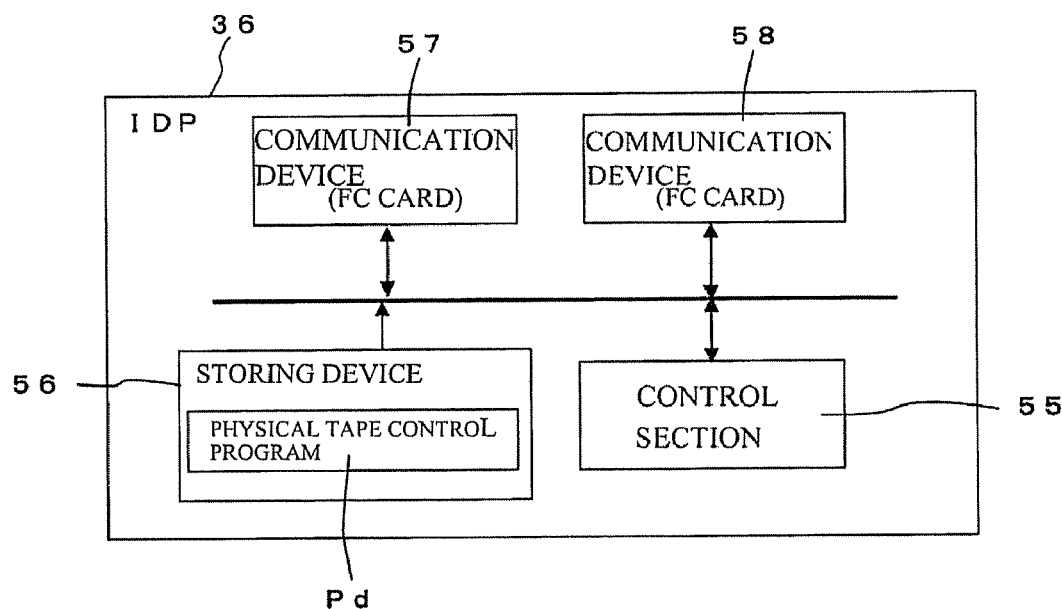
FIG. 3 is a block diagram of an IDP constituting the computer system.

As shown in FIG. 3, the IDP 36 comprises: a control section 55 constituted by a CPU and memories; and a storage device 56 for storing a physical tape control program Pd. The IDP 36 further comprises: a first communication device 57 for sending data to and receiving data from the intermediate-level switch 44; and a second communication device 58 for sending data to and receiving data from the lower-level switch 46. In the present embodiment, the first communication device 57 is a first FC card for connecting the FC line to the intermediate-level switch 44; the second communication device 58 is a second FC card for connecting the FC line to the lower-level switch 46.

The physical tape control program Pd stored in the storing device 56 of the IDP 36 is programmed so as to make the IDP 36 execute the prescribed function for controlling the physical tape unit 31 to back up and restore logical volumes of the virtual tape unit 32.

(Virtual Tape Unit)

Figure 4:
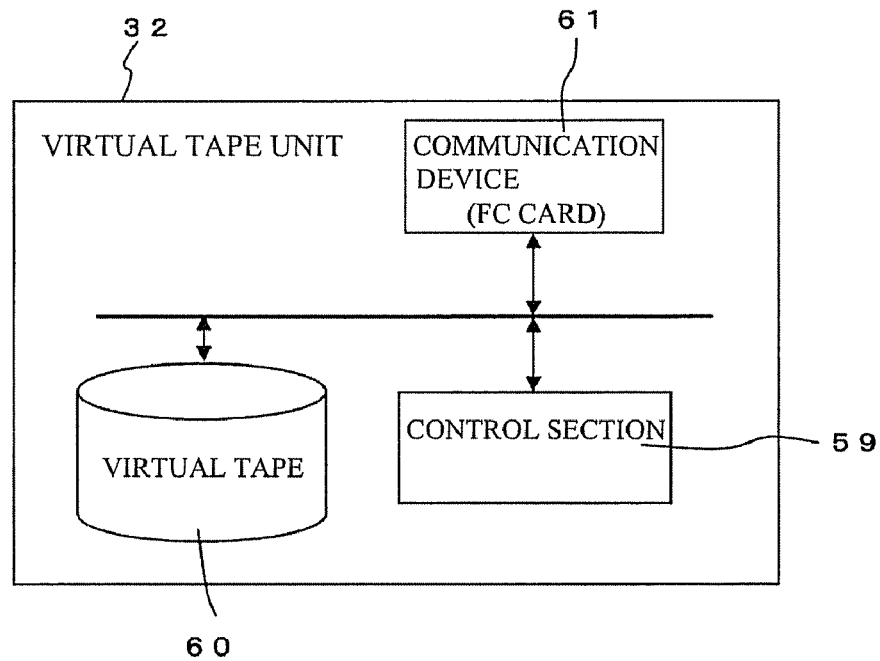
FIG. 4 is a block diagram of a virtual tape unit constituting the computer system.

As shown in FIG. 4, the virtual tape unit 32 comprises: a control section 59 constituted by a CPU and memories; magnetic disks 60; and a communication device 61, e.g., FC card, for sending data to and receiving data from the intermediate-level switch 44. The magnetic disks 60 act as the virtual tapes.

(ICP)

Figure 5:
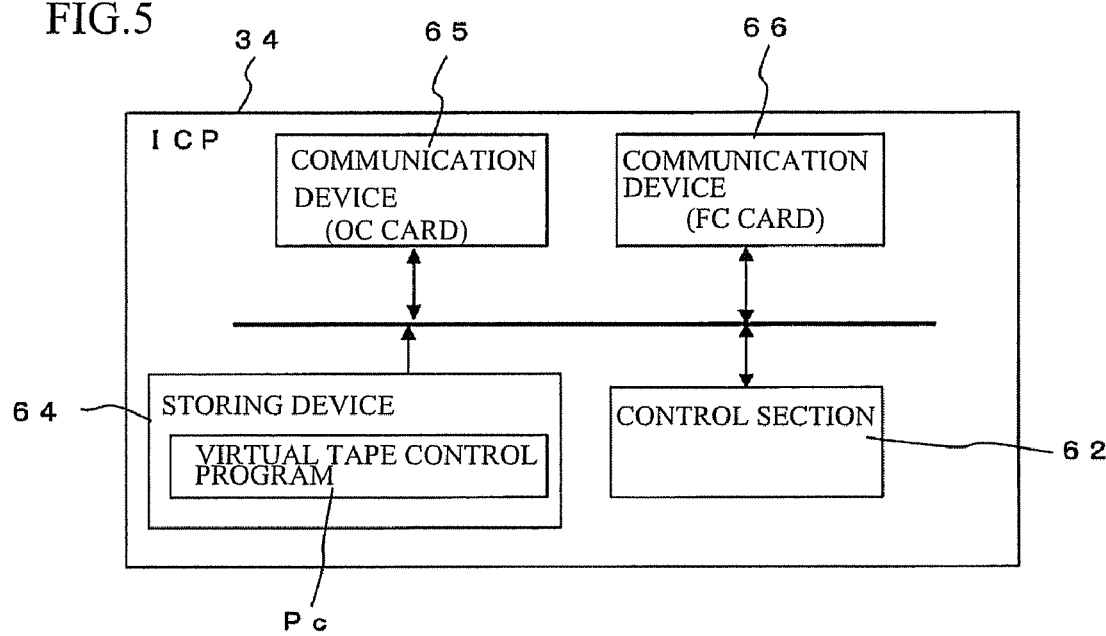
FIG. 5 is a block diagram of an ICP constituting the computer system.

As shown in FIG. 5, the ICP 34 comprises: a control section constituted 62 by a CPU and memories; and a storing device 64 for storing a virtual tape control program Pc. The ICP 34 further comprises: a first communication device 65 for sending data to and receiving data from the upper-level switch 42; and a second communication device 66 for sending data to and receiving data from the intermediate-level switch 44.

In the present embodiment, the first communication device 65 is an OC card for connecting the optical fiber to the upper-level switch 42; the second communication device 66 is a FC card for connecting the FC line to the intermediate-level switch 44.

The virtual tape control program Pc stored in the storing device 64 of the ICP 34 is programmed so as to execute a prescribed function for controlling the ICP 34 to output signals for reading data from and writing data in the virtual tape unit 32. Namely, the control section 62 of the ICP 34 reads and executes the virtual tape control program Pc, so that the function of reading data from and writing data in the virtual tape unit 32 can be performed.

Note that, the terminal equipments (not shown) connected to the upper-level switch 42 actually send read/write commands, so the ICP 34 sends read/write commands to the virtual tape unit 32 on the basis of instructions from the terminal equipments.

(VLP)

Figure 6:
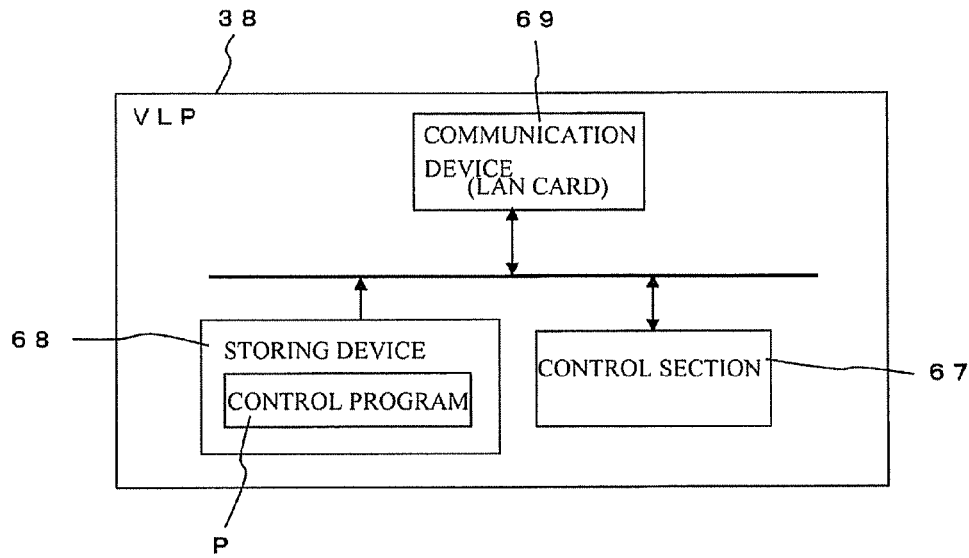
FIG. 6 is a block diagram of a VLP constituting the computer system.

As shown in FIG. 6, the VLP 36 comprises: a control section 67 constituted by a CPU and memories; a storing device 68 for storing a control program P; and a communication device 69 for sending data to and receiving data from the intermediate-level switch 44. In the present embodiment, the communication device 69 is a LAN card for connecting the LAN to the intermediate-level switch 44.

The control program P stored in the storing device 68 of the VLP 38 is programmed so as to execute a prescribed function for controlling the VLP 38 to manage volumes of the virtual tape unit 32 and the physical tape units 31 and controlling the entire system. Namely, the control section 67 of the VLP 38 reads and executes the control program P, so that the volumes of the virtual tape unit 32 and the physical tape units 31 can be managed, and the entire system can be controlled.

Note that, in the present embodiment, two VLPs 38 are provided, but the two VLPs 38 are not simultaneously operated. One of the VLPs 38 is usually on standby for backup (redundancy).

Namely, one of the VLPs 38 is not operated, as a backup VLP, in a normal state. In case that an abnormal state occurs in the VLP 38 in operation, the backup VLP 38 takes over the job or the action of the abnormal VLP 38.

(Standby Server Computer)

The standby server computer 40 has a plurality of communication devices, which can be connected to all of the upper-level switch 42, the intermediate-level switch 44 and the lower-level switch 46 so as to take over and execute actions of the ICPs 34, the IDPs 36 and the VLPs 38.

The standby server computer 40 is connected to the upper-level switch 42 by an optical fiber and connected to the intermediate-level switch 44 and the lower-level switch 46 by FC lines.

Figure 7:
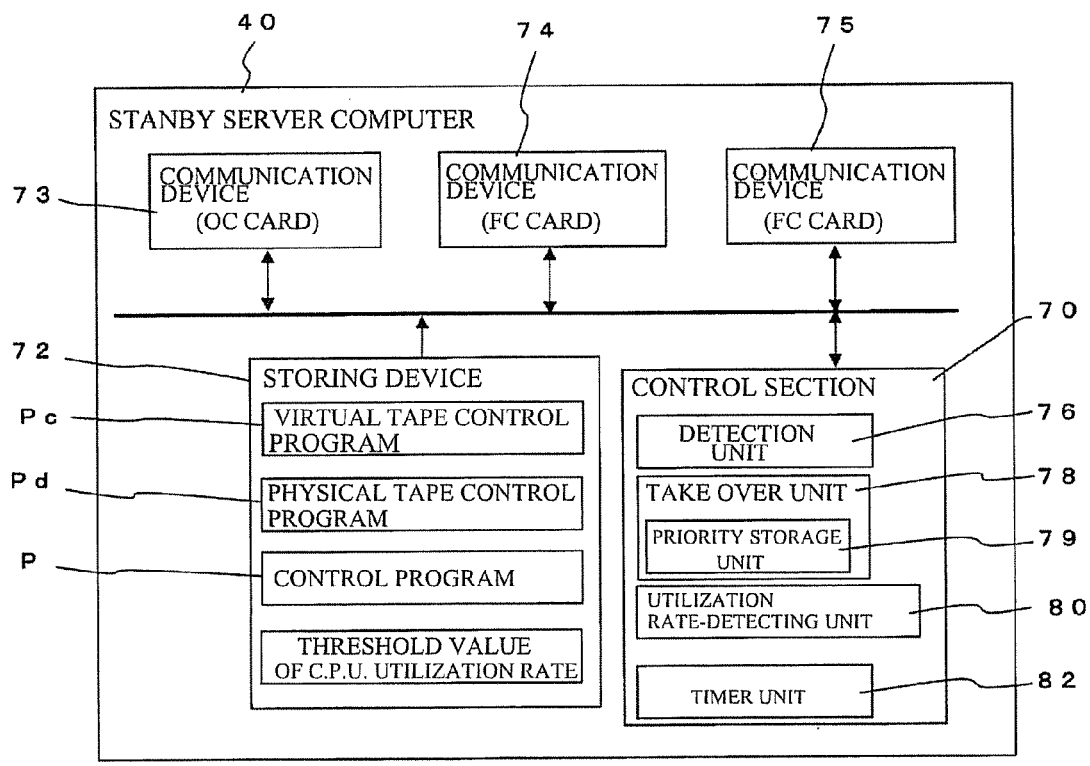
FIG. 7 is a block diagram of a standby server computer constituting the computer system.

As shown in FIG. 7, the standby server computer 40 comprises: a first communication device 73 capable of being connected to the upper-level switch 42; a second communication device 74 capable of being connected to the intermediate-level switch 44; and a third communication device 75 capable of being connected to the lower-level switch 46. In the present embodiment, the first communication device 73 is an OC card, and the second communication device 74 and the third communication device 75 are FC cards.

The standby server computer 40 further comprises: a control section 70 constituted by a CPU and memories; and a storing device 72 for storing the physical tape control program Pd, the virtual tape control program Pc and the control program P.

The control section 70 of the standby server computer 40 reads and executes the control program P. Therefore, the control section 70 can manage the volumes of the virtual tape unit 32 and the physical tape units 31 and can control the entire system. Namely, by reading and executing the control program P with the control section 70, the standby server computer 40 can take over the function of the VLP 38.

The control section 70 of the standby server computer 40 reads and executes the virtual tape control program Pc so as to output the read/write commands to the virtual tape unit 32. Namely, by reading and executing the virtual tape control program Pc with the control section 70, the standby server computer 40 can take over the function of the ICPs 34.

Further, control section 70 of the standby server computer 40 reads and executes the physical tape control program Pd so as to back up or restore the logical volumes of the virtual tape unit 32 into the physical tape units 31. Namely, by reading and executing the physical tape control program Pd with the control section 70, the standby server computer 40 can take over the function of the IDPs 36.

The standby server computer 40 further comprises detection unit 76. The control section 70 realizes the detection unit 76 by reading and executing an abnormal state detection program (not shown), which is stored in the storing device 72 of the standby server computer 40.

The detection unit 76 always monitors actions of the ICPs 34, the IDPs 36 and the VLPs 38. When the detection unit 76 detects breakdown of any one of server computers, the server computer broken down is judges as an abnormal server computer.

The standby server computer 40 further comprises take-over unit 78. The control section 70 realizes the take-over unit 78 by reading a take-over control program (not shown), which is stored in the storing device 72 of the standby server computer 40.

The standby server computer 40 further comprises utilization rate-detecting unit 80. The control section 70 realizes the utilization rate-detecting unit 80 by reading a utilization rate detection program (not shown), which is stored in the storing device 72 of the standby server computer 40.

The standby server computer 40 further comprises priority storage unit 79. In the present embodiment, the priority of the VLPs 38 is stored as the top priority because the entire system will break down if the VLP 38 is in the abnormal state. In the present embodiment, priorities of the server computers are written in the take-over control program, so the take-over unit 78 has the function of the priority storage unit 79.

With this structure, the standby server computer can take over the action of the abnormal server computer having any function, so that performance, reliability and redundancy of the computer system can be maintained without performing degenerate actions.

(Actions of Standby Server Computer)

The actions of the standby server computer 40 will be explained with reference to a flow chart of FIG. 8.

The detection unit 76 of the standby server computer 40 always checks the server computers, i.e., the ICPs, the IDPs and the VLPs, if any of them are in the abnormal state or not (step S100).

In the case that the detection unit 76 detects the server computer in the abnormal state, the take-over unit 78 checks if number of the abnormal computer is one or more (step S102).

If the number of the abnormal computer is one, the take-over unit 78 reads the program P, Pc or Pd relating to the abnormal server computer, which corresponds to the function of the abnormal server computer, from the storing device 72 and makes the control section 70 execute the program. With this action, the take-over unit 78 makes the standby server computer 40 take over the job or the action of the abnormal server computer (step S103).

If the number of the abnormal computer is two or more, the take-over unit 78 checks if the VLP 38 is included in the abnormal computers or not (step S104).

If the VLP 38 is included in the abnormal server computers, the take-over unit 78 checks if the VLP 38 is redundant or not (step S106).

If the abnormal VLP 38 is not redundant or the abnormal VLP 38 is the backup VLP, the take-over unit 78 reads the control program P from the storing device 72 and makes the control section 70 execute the program P. With this action, the standby server computer 40 takes over the job or the action of the VLP 38 (step S108). In case that the abnormal VLP 38 is not redundant, breakdown of the system can be prevented.

If the abnormal VLP 38 is redundant, the backup VLP 38 can be used. Thus, the standby server computer 40 takes over the job or the action of any one of the abnormal ICPs 34 or the abnormal IDPs 36.

Note that, in the step S104, if the VLP 38 is not included in the abnormal server computers, the standby server computer 40 takes over the job or the action of any one of the abnormal ICPs 34 or the abnormal IDPs 36.

In case that the standby server computer 40 takes over the action of the ICP 34 or the IDP 36, the take-over unit 78 makes the utilization rate-detecting unit 80 detect a CPU utilization rate of a group of the ICPs 34 and that of a group of the IDPs 36. Note that, the CPU utilization rate is the utilization rate of only the CPUs of the normal server computers.

The take-over unit 78 controls the standby server computer 40 to take over the action of the ICP 34 group or the IDP 36 group whose CPU utilization rate is higher than the other group (step S105). At that time, the take-over unit 78 reads the physical tape control program Pd or the virtual tape control program Pc from the storing device 72 and makes the control section 70 execute the program read. With this action, the standby server computer 40 takes over the job or the action of the ICP 34 or the IDP 36.

Figure 9:
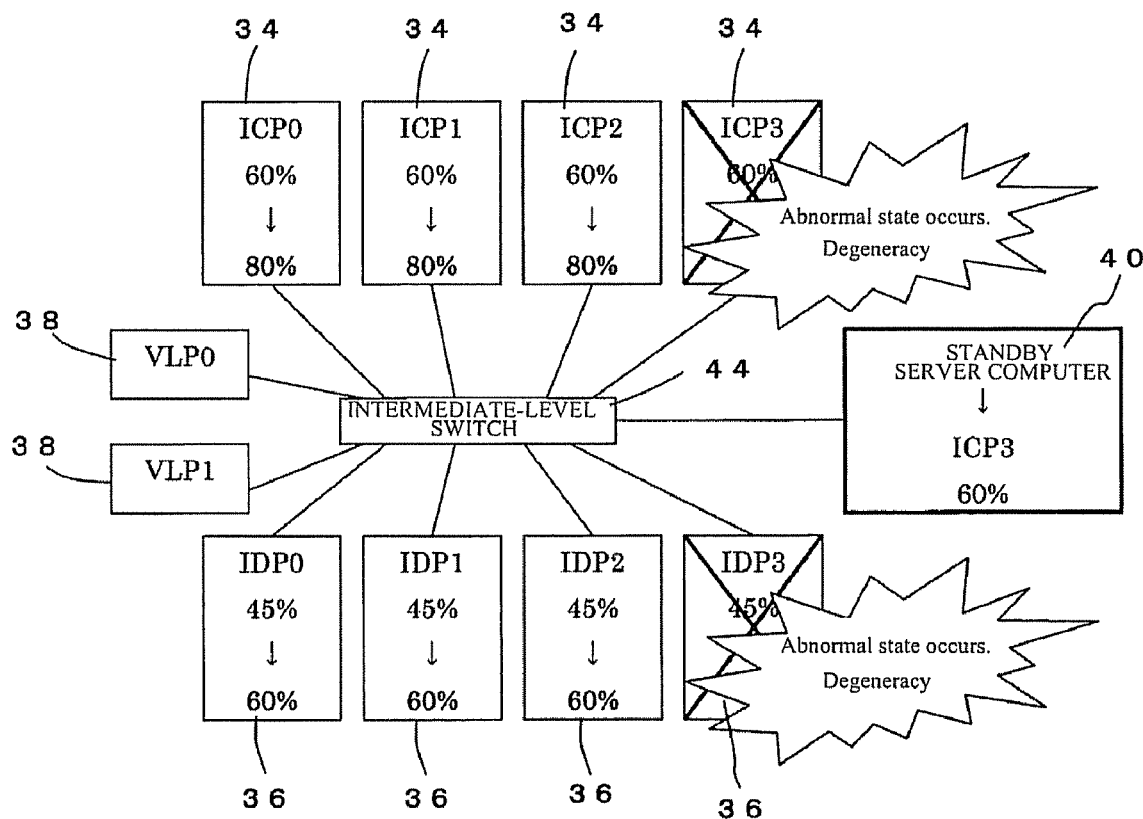
FIG. 9 is an explanation view showing actions of the standby server computer in case that two server computers are in abnormal states.

A concrete example of the take-over, in which the action of the server computers included in the ICP group or the IDP group, whose CPU utilization rate is higher than the other group, are taken over by the standby server computer 40, will be explained with reference to FIG. 9.

For example, four ICPs 34 constitute the ICP group, the CPU utilization rate of each of the ICPs 34 is 60%; four IDPs 36 constitute the IDP group, the CPU utilization rate of each of the IDPs 36 is 45%. At that time, one of the ICPs 34 and one of the IDPs 36 simultaneously break down and come into the abnormal states.

The utilization rate-detecting unit 80 detects the CPU utilization rate of the ICP group except the abnormal ICP 34, i.e., three ICPs 34, and that of the IDP group except the abnormal IDP 36, i.e., three IDPs 36.

In this example, the CPU utilization rate of the ICP group is 80%; the CPU utilization rate of the IDP group is 60%.

Then, the take-over unit 78 makes the standby server computer 40 take over the action of the ICP 34 whose CPU utilization rate, which has been detected after detecting the abnormal state, is the highest of the three. By adding the standby server computer 40 to the ICP group, the CPU utilization rate of the ICP group can be recovered to 60%.

Figure 10:
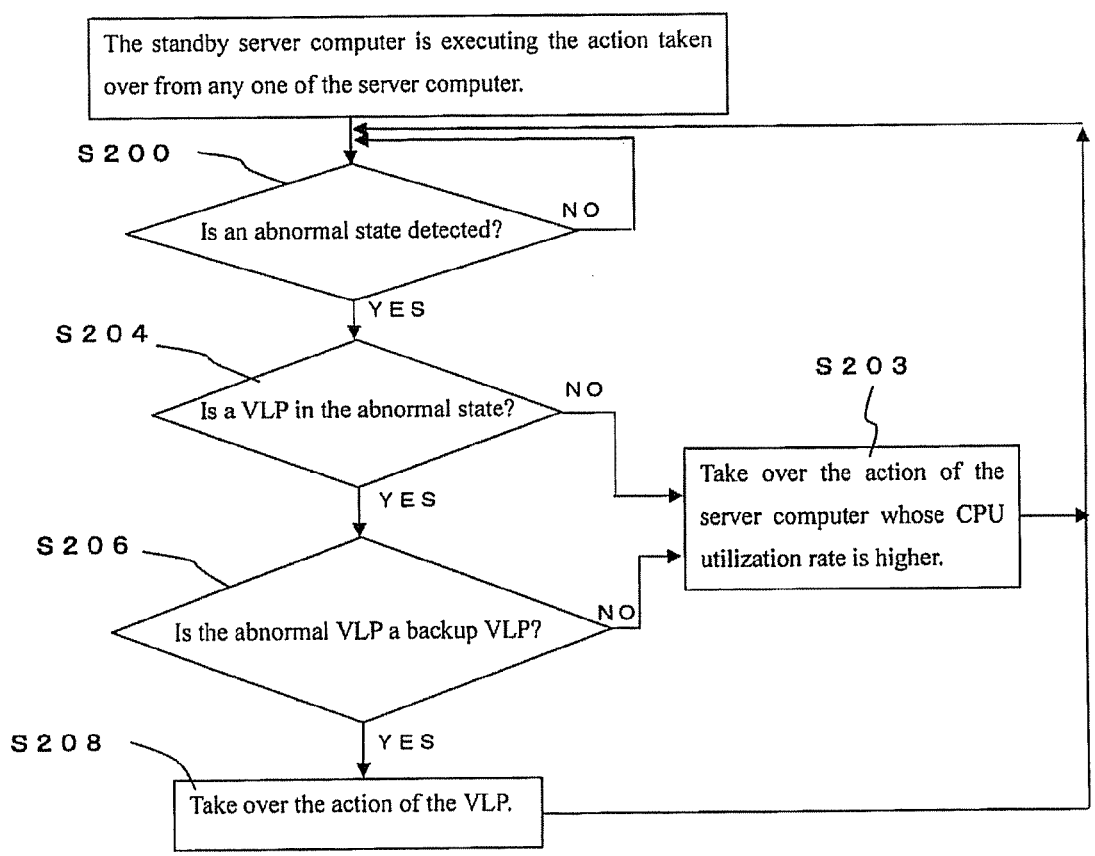
FIG. 10 is a flow chart showing actions of the standby server computer in case that another server computer goes into an abnormal state while taking over the action of one server computer.

Next, another case, in which another server computer breaks down after the standby server computer 40 takes over the actions of the abnormal server computer, will be explained with reference to a flow chart of FIG. 10.

The detection unit 76 further monitors the occurrence of the abnormal state of the server computer after the standby server computer 40 takes over the action of any one of the ICPs 34, IDPs 36 and the VLP 38 (step S200).

When the detection unit 76 detects the abnormal state in any of the server computers, the take-over unit 78 checks if the VLP 38 is included in the abnormal computers or not (step S204).

If the VLP 38 is included in the abnormal server computers, the take-over unit 78 checks if the VLP 38 is redundant or not (step S206).

In case that the abnormal VLP 38 is not redundant or the abnormal VLP 38 is the backup VLP, if the present action of the standby server computer 40 has been taken over from the ICP 34 or the IDP 36, the take-over unit 78 stops the present action, reads the control program P from the storing device 72 and makes the control section 70 execute the program P. With this action, the standby server computer 40 takes over the job or the action of the VLP 38 (step S208).

In case that the abnormal VLP 38 is not redundant, the backup VLP 38 takes over the job or the action of the abnormal VLP 38, so the standby server computer 40 takes over the action of any one of the ICPs 34 and the IDPs 36.

Note that, in the step S204, if the VLP 38 is not included in the abnormal server computers, the standby server computer 40 takes over the job or the action of any one of the abnormal ICPs 34 or the abnormal IDPs 36.

In case that the standby server computer 40 takes over the action of the ICP 34 or the IDP 36, the take-over unit 78 makes the utilization rate-detecting unit 80 detect the CPU utilization rate of the ICP group and that of the IDP group. Note that, as to calculation of the CPU utilization rates, the standby server computer 40 is included in the ICP group or the IDP group on the basis of the present performing action.

The take-over unit 78 controls the standby server computer 40 to take over the action of the ICP group or the IDP group whose CPU utilization rate is higher than the other group. Namely, if the group including the standby server computer 40 is the group whose CPU utilization rate is higher than the other, the standby server computer 40 continues the present action. On the other hand, if the group including the standby server computer 40 is not the group whose CPU utilization rate is higher than the other, the take-over unit 78 stops the present action, reads the control program of the group whose CPU utilization rate is higher from the storing device 72 and makes the control section 70 execute the program read. With this action, the standby server computer takes over the job or the action of the group whose CPU utilization rate is higher than the other (step S203). With this action, loads of the CPU can be reduced.

Figure 11:
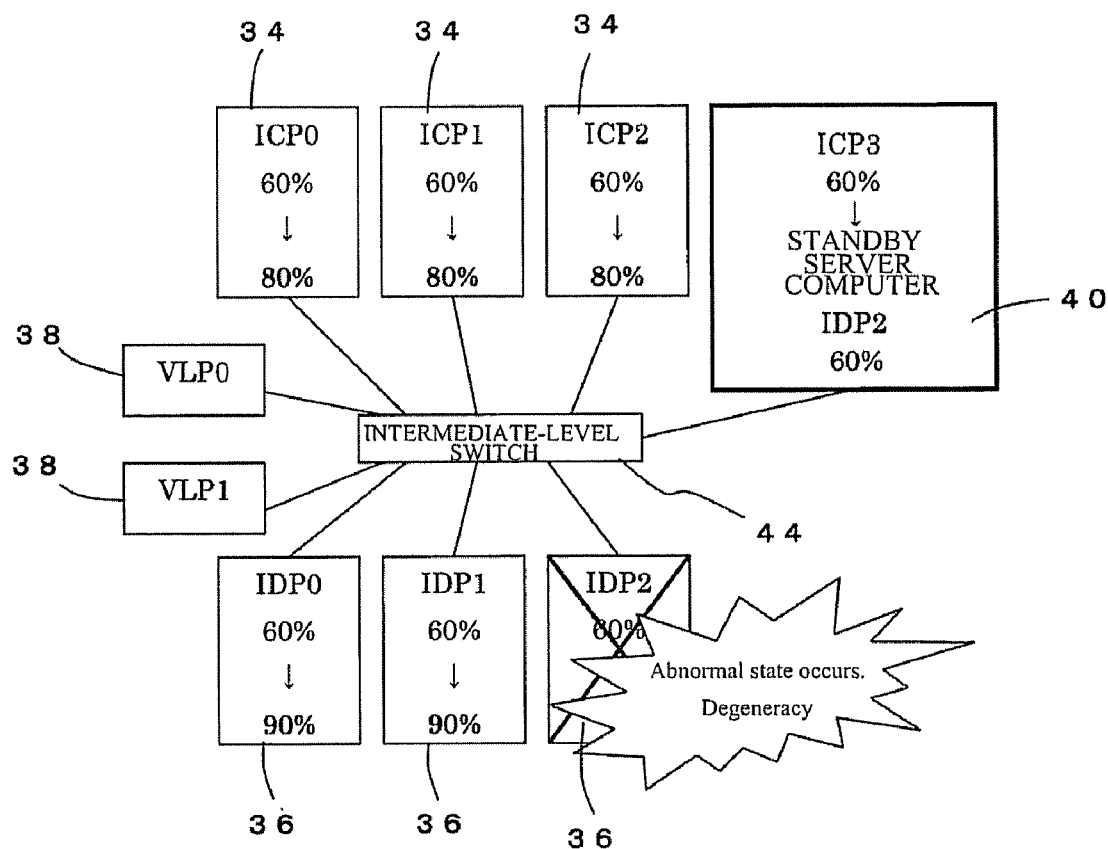
FIG. 11 is an explanation view showing actions of the standby server computer in case that another server computer goes into an abnormal state while taking over the action of one server computer.

A concrete example, in which the IDP 36 comes into an abnormal state while the standby server computer 40 already performs the action of the ICP group, will be explained with reference to FIG. 11.

For example, the ICP group includes three ICPs 34 and the standby server computer 40, and the CPU utilization rate of each server computer is 60%; three IDPs 36 constitute the IDP group, and the CPU utilization rate of each server computer is 60%. At that time, one of the IDPs 36 breaks down and comes into the abnormal state.

The utilization rate-detecting unit 80 detects the CPU utilization rate of the ICP group, which is constituted by four server computers including the standby server computer 40, and that of the IDP group except the abnormal IDP 36, i.e., two normal IDPs 36.

In this example, the CPU utilization rate of the ICP group is 60%; the CPU utilization rate of the IDP group is 90%.

Then, the take-over unit 78 stops the ICP action of the standby server computer 40 and makes the standby server computer 40 take over the action of the IDP 36, whose CPU utilization rate detected after occurring the abnormal state is the highest of the two. By adding the standby server computer 40 to the IDP group, the CPU utilization rate of the IDP group can be recovered to 60%.

Next, the action of the standby server computer in case of detecting no abnormal states in any server computers will be explained.

In this case, the standby server computer may be operated on the basis of user's commands. For example, the control section 70 of the standby server computer 40 has timer unit 82 (see FIG. 7), and time for actuating the time unit 82 can be set by the user.

Figure 12:
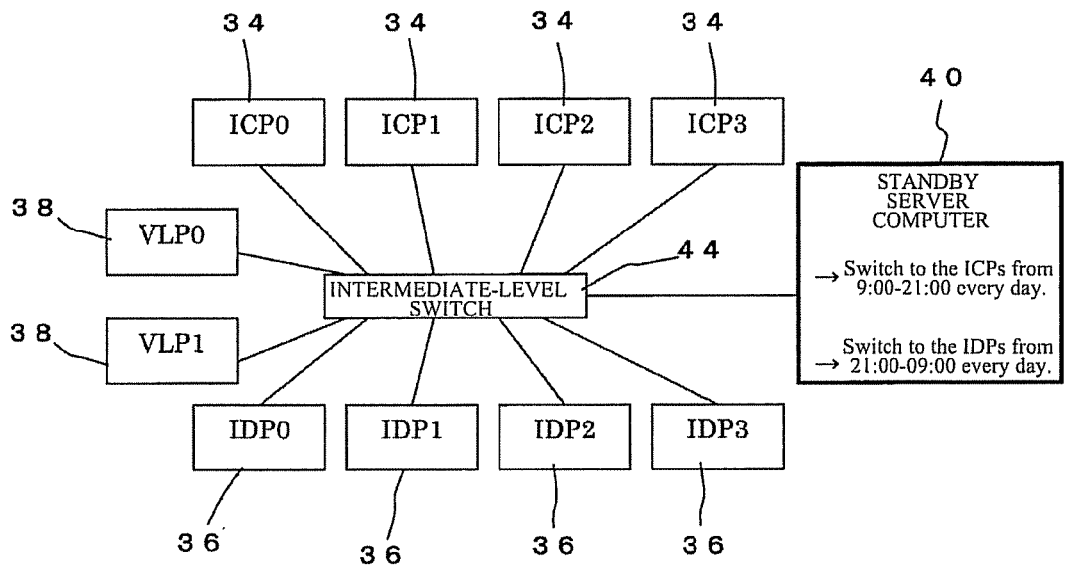
FIG. 12 is an explanation view of the action of the standby server computer, which is performed on a timer function, when no abnormal state is detected.

An example, in which the standby server computer 40 is actuated by the timer unit 82, is shown in FIG. 12.

Generally, in companies, the virtual tape systems 30 are used for storing data in magnetic tapes. Therefore, a lot of works, in which data are stored in the virtual tape unit 32, are performed in the daytime; the data stored in the virtual tape unit 32 are mainly stored in the night.

Namely, loads of the ICPs 34 are increased in the daytime; loads of the IDPs 36 are increased in the night. Thus, the timer unit 82 may be set to actuate the standby server computer 40 at a predetermined time, from which loads of the server computers increase, so as to reduce the loads.

For example, the timer unit 82 may actuate the ICPs 34 in a time period from 09:00 to 21:00 every day and may actuate the IDPs 36 in a time period from 21:00 to 09:00 every day.

In this example, the take-over unit 78 of the standby server computer 40 reads the virtual tape control program Pc or the physical tape control program Pd for the ICP 34 or the IDP 36 from the storing device 72 so as to make the control section 70 start to execute the action of the assigned server computer, at the predetermined time, by using the timer unit 82.

With this action, the standby server computer 40 can reduce loads of the server computers while the preset time periods, in which the loads are made greater.

Next, another example, in which the standby server computer 40 takes over the action of one of any server computers when no abnormal server computers are detected, will be explained.

In this example, a threshold value of the CPU utilization rate is previously assigned to each of the server computers. When the take-over unit 78 judges that the CPU utilization rate of any one of the server computers, which has been detected by the utilization rate-detecting unit 80, exceeds the assigned threshold value, the standby server computer 40 takes over the action of the server computer whose CPU utilization rate exceeds the assigned threshold value.

Figure 13:
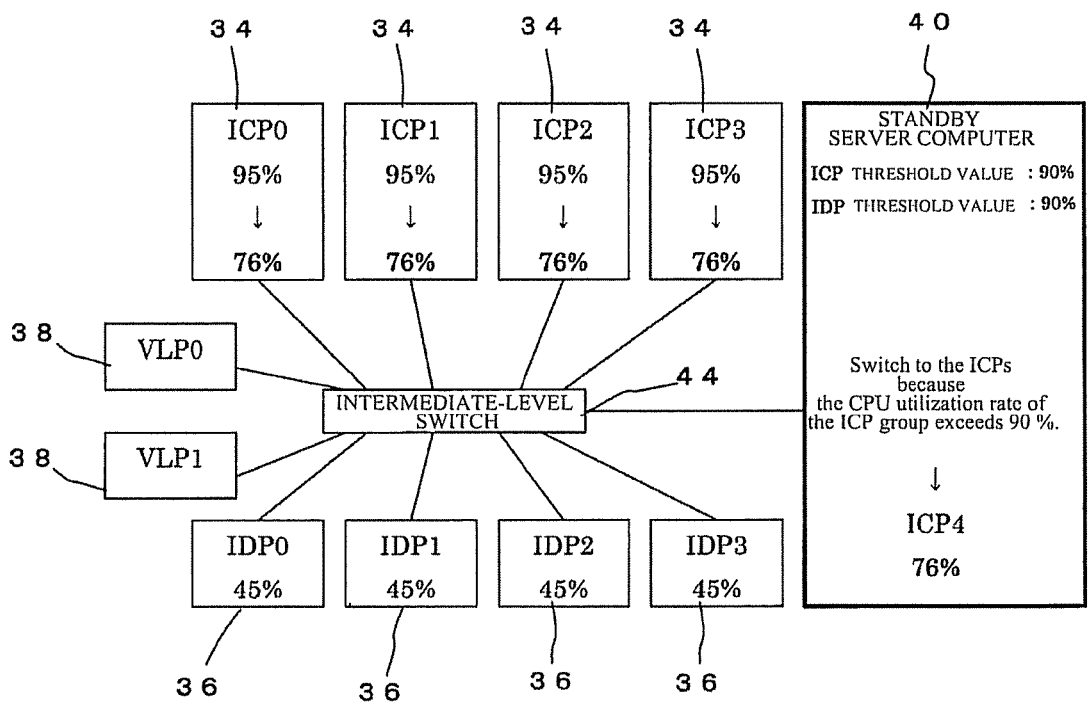
FIG. 13 is an explanation view of the action of the stand by server computer, which is performed on a threshold value of a CPU utilization rate, when no abnormal state is detected.
Figure 14:
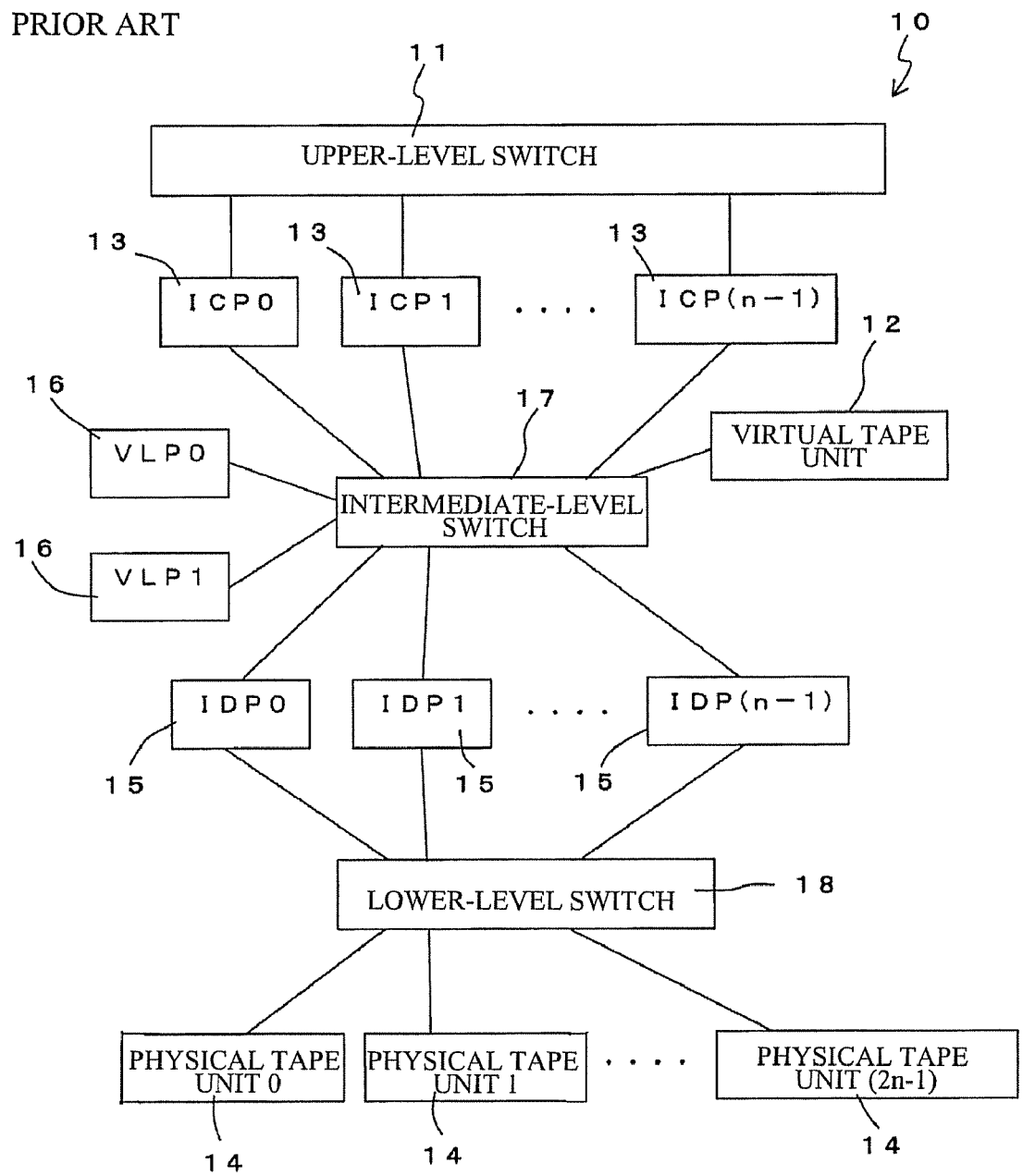
FIG. 14 is an explanation view of the conventional virtual tape system.

An example of the action of the standby server computer 40, which is performed when the CPU utilization rate of any one of the server computers exceeds the assigned threshold value, will be explained with reference to FIG. 13.

The threshold values of the CPU utilization rates of the server computers, which have been previously set by the user, are stored in the storing device 72. The threshold values of the CPU utilization rates of the ICPs 34 and the IDPs 36 are 90%, and they are stored in the storing device 72.

The utilization rate-detecting unit 80 always monitors the CPU utilization rates, and the take-over unit 78 compares the CPU utilization rates detected by the utilization rate-detecting unit 80 with the threshold values stored in the string device 72.

When the take-over unit 78 judges that any one of the detected CPU utilization rates exceeds the threshold value, the take-over unit 78 reads the control program of the server computer whose CPU utilization rate exceeds the threshold value from the storing unit 72 so as to make the control section 70 execute the control program read.

In this example, the standby server computer 40 can reduce loads of the server computer whose loads are greater, so that the performance of the system can be improved.

In the above described embodiments, the standby server computer 40 works on the basis of detecting the abnormal state, the time determined by the timer unit 82 and the threshold values of the CPU utilization rate have been explained.

Figure 8:
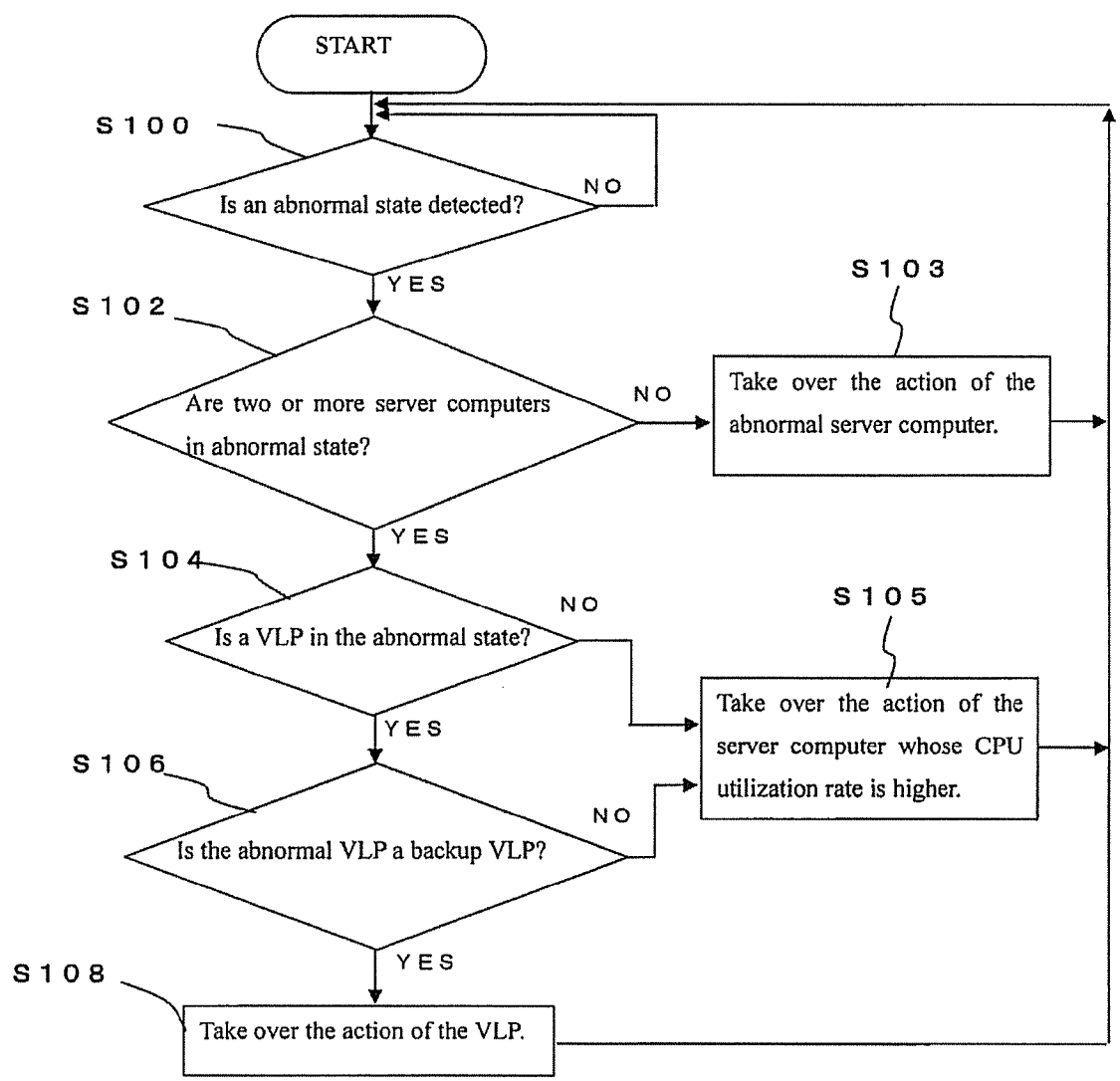
FIG. 8 is a flow chart showing actions of the standby server computer.

Further, in the case that the detection unit 76 detects an abnormal state while the standby server computer 40 works on the basis of the time determined by the timer unit 82 or the threshold values of the CPU utilization rate, the standby server computer 40 may take over the action of the abnormal server computer as shown in the flowchart of FIG. 8.

The detection unit 76, the take-over unit 78 and the utilization rate-detecting unit 80 need not be provided in the standby server computer 40. They may be provided in another server computer, etc.

The computer system of the present invention is not limited to the virtual tape system of the above described embodiments. The present invention may be applied to other computer systems, in each of which a plurality of server computers having different functions are mutually connected by communication lines.

Further, in case that the ICPs 34, the virtual tape unit 32, the VLPs 38, the IDPs 36 and the physical tape units 31 are accommodated in one housing, the standby server computer 40 too may be provided in the housing. With this structure, even if all of the server computers are accommodated in a limited space, i.e., the housing, functions of all of the server computers can be backed up and the entire system can be compacted and downsized.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A virtual tape system comprising:
a plurality of physical tape units;
a virtual tape unit;
a lower-level switch being coupled to the physical tape units;
a plurality of integrated device processors (IDPs) being coupled to the lower-level switch, the IDPs being server computers to control the physical tape units by a first program to execute an action of the virtual tape unit;
an intermediate-level switch being coupled to the IDPs;
an upper-level switch being coupled to a user terminal equipment;
a plurality of integrated channel processors (ICPs) being coupled to the intermediate-level switch and the upper-level switch, the ICPs being server computers to execute read/write processes of the virtual tape unit by a second program;
a virtual library processor (VLP) being coupled to the intermediate-level switch, the VLP being a server computer to control the whole system by a third program; and
a standby processor including a memory storing the first, second and third program so as to be capable of taking over and executing the actions of all of the IDPs, ICPs and VLP, and being coupled to all of the upper-level switch, the intermediate-level switch, and the lower-level switch, and;
wherein the standby processor detects an abnormal state of each of the IDPs, ICPs and VLP,
reads one of the first, second and third program corresponding to the abnormal processor from the memory when the abnormal state is detected, and takes over the operation of the detected abnormal processor by executing the read program.

2. The virtual tape system according to claim 1,
further comprising priority storage means for storing priority of the IDPs, ICPs and VLP,
wherein the standby processor reads the priority of any of the abnormal IDPs, ICPs and VLP from the priority storage means when a plurality of the abnormal states is detected in the abnormal IDPs, ICPs and VLP, and
the standby processor takes over the action of one of the IDPs, ICPs and VLP whose priority is the highest of them.

3. The virtual tape system according to claim 1,
wherein the IDPs, ICPs and VLP are divided into a plurality of server groups on the basis of the functions, and
the standby processor calculates CPU utilization rates of the server groups including the abnormal IDPs, ICPs and VLP when a plurality of the abnormal states is detected in any of the abnormal IDPs, ICPs and VLP, and takes over the actions of the IDPs, ICPs and VLP in the server group whose CPU utilization rate is the highest of the server groups.

4. The virtual tape system according to claim 3,
wherein the standby processor calculates a CPU utilization rate of the server group including the standby processor when the abnormal state is detected in any of the IDPs, ICPs and VLP while the standby processor takes over and performs the function of any of the IDPs, ICPs and VLP, calculates a CPU utilization rate of the server group including any of the abnormal IDPs, ICPs and VLP newly detected, compares the CPU utilization rates of the server groups, performs the action of any of the IDPs, ICPs and VLP in the server group including the standby processor when the CPU utilization rate of the server group including the standby processor is higher than the other, and stops the action of any of the IDPs, ICPs and VLP in the server group including the standby processor and take over the action of the standby processor in the server group including any of the abnormal IDPs, ICPs and VLP newly detected when the CPU utilization rate of the server group including any of the abnormal IDPs, ICPs and VLP newly detected is higher than the other.

5. The virtual tape system according to claim 1,
wherein the standby processor performs the action of any of the IDPs, ICPs and VLP, which fulfills a prescribed condition, while the abnormal state is detected in any of the IDPs, ICPs and VLP.

6. The virtual tape system according to claim 5,
wherein the standby processor performs the prescribed action of any of the IDPs, ICPs and VLP at predetermined time.

7. The virtual tape system according to claim 5,
further comprising:
threshold value storage means, which stores a threshold value of the CPU utilization rate, is provided to each of the server groups; and
utilization rate-detecting means for detecting the CPU utilization rate of each of the server groups,
wherein the standby processor performs the actions of the specific server group when the CPU utilization rate of the specific sever group, which is detected by the utilization rate-detecting means, is greater than the threshold value thereof, which is stored in the threshold value storage means.

8. A storage control system for controlling a storage apparatus, the storage control system comprising:
a first processor which performs an operation by a first program;
a second processor which performs an operation different from the first processor by a second program; and
a standby processor being coupled to the first and second processors, the standby processor including a memory storing the first and second program so as to be capable of performing each operation of the first and second processors,
wherein the standby processor detects an abnormal state of each of the first and second processors, reads the first or second program from the memory when the abnormal state is detected, and takes over the operation of the detected abnormal processor by executing the read program.

9. A storage control system according to claim 8,
wherein, when the standby processor detects abnormal states of the first and second processors, the standby processor selects one of the detected abnormal first and second processors, and takes over the operation of the selected processor.

10. A storage control system according to claim 9,
wherein, when a redundancy processor capable of taking over the operation of the abnormal processor is detected, the standby processor takes over the other abnormal processor.

11. A virtual tape system according to claim 1,
wherein, when the standby processor detects abnormal states among the processors, the standby processor selects one of the detected abnormal processors, and takes over the operation of the selected processor.

12. A virtual tape system according to claim 11,
wherein, when a redundancy processor to be capable of taking over the operation of the abnormal processor is fined, the standby processor takes over the other abnormal processor.

* * * * *

UNITED STATES PATENT AND TRADEMARK OFFICE
CERTIFICATE OF CORRECTION

PATENT NO. : 8,370,682 B2  
APPLICATION NO. : 12/341569  
DATED : February 5, 2013  
INVENTOR(S) : Shigeru Tsukada et al.

Page 1 of 1

It is certified that error appears in the above-identified patent and that said Letters Patent is hereby corrected as shown below:

In the Claims:

Column 11, Line 43, In Claim 7, delete "sever" and insert -- server --, therefor.

Signed and Sealed this  
Seventh Day of May, 2013

Teresa Stanek Rea  
*Acting Director of the United States Patent and Trademark Office*